July 31, 1934.                J. C. CURTIS                1,968,378
                               ROCK DRILL
                           Filed July 30, 1932
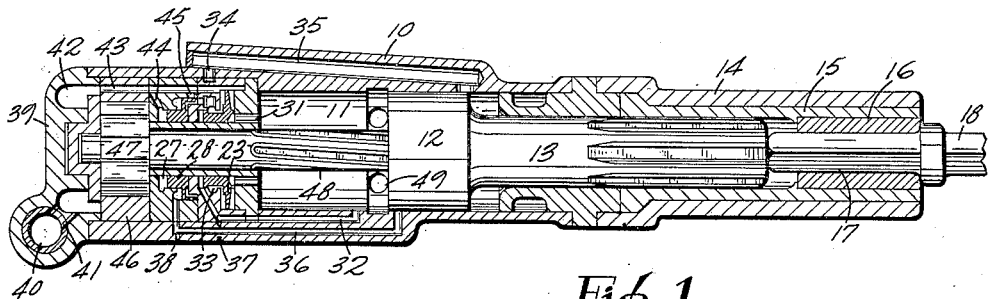
Fig. 1
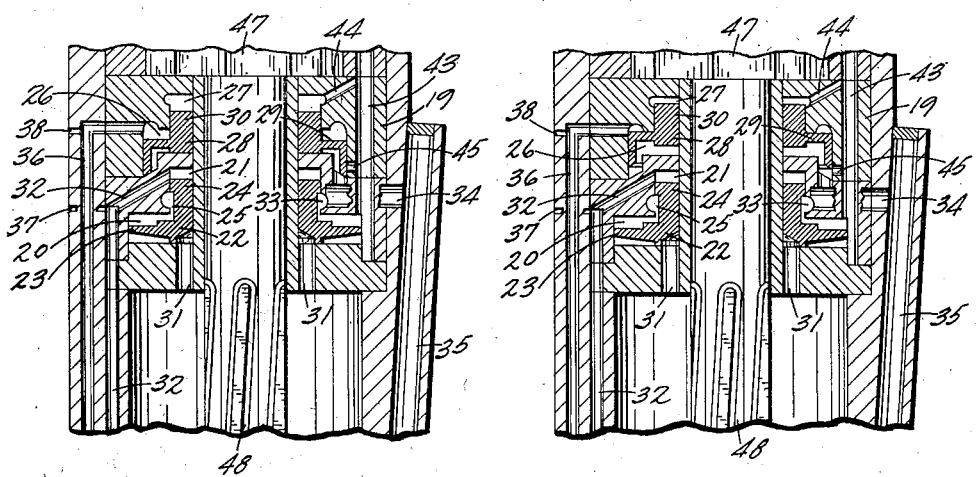
Fig. 2                                                    Fig. 3
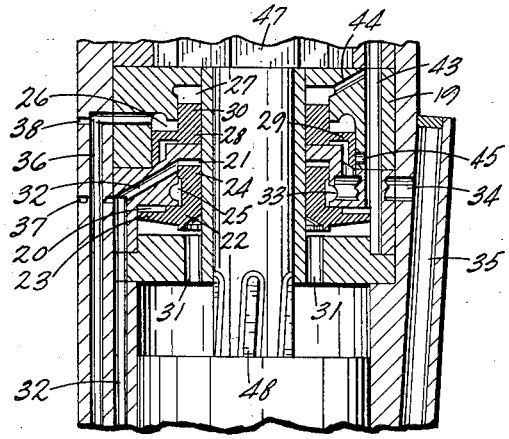
Fig. 4
JOHN C. CURTIS
INVENTOR
BY  *John E. Reufer*
ATTORNEY Patented July 31, 1934

1,968,378

UNITED STATES PATENT OFFICE 1,968,378

ROCK DRILL

John C. Curtis, Cleveland, Ohio, assignor to The Cleveland Rock Drill Company, Cleveland, Ohio, a corporation of Ohio Application July 30, 1932, Serial No. 626,258

16 Claims. (Cl. 121—16)

This invention relates broadly to rock drills, but more particularly to valves for fluid actuated rock drills of the rotary type.

It is among the objects of this invention to provide a fluid actuated rock drill with a valvular mechanism, whereby the motive fluid admitted to the forward end of the cylinder to return and rotate the hammer, may be automatically increased when the torque resistance of the hammer is augmented, thus producing a machine with a variable power rotation.

Other objects more or less ancillary to the foregoing will appear in the accompanying drawing, which sets forth the preferred embodiment of the invention.

Fig. 1 is a longitudinal sectional view of a rock drill illustrating the invention.

Fig. 2 is an enlarged longitudinal sectional view of a portion of the rock drill, illustrating the valvular mechanism with the valves positioned to deliver the regular amount of pressure fluid into the front end of the cylinder.

Fig. 3 is a view similar to Fig. 2, illustrating the valves positioned to deliver an additional amount of pressure fluid into the front end of the machine.

Fig. 4 is also a view similar to Fig. 2, illustrating the valves positioned to deliver motive fluid into the rear end of the cylinder.

Referring to the drawing in which like symbols designate corresponding parts throughout the several views, there is shown a cylinder 10, formed with a piston chamber 11 having a piston 12 reciprocably mounted therein. The piston is formed with a head having a fluted stem 13 projecting therefrom.

Secured to the cylinder 10, there is a front housing 14 having rotatably mounted therein a chuck 15. This chuck is provided with a fluted bore within which the fluted stem 13 is capable of slidable but non-rotatable engagement. Within its front end, the chuck 15 is equipped with a chuck bushing 16, maintained therein in pressed fit relation, and capable to slidably receive the shank 17 of a cutting tool 18 upon which the piston 12, by the medium of its stem 13, is capable to deliver its blows.

Mounted within the rearward end of the cylinder, there is a plurality of members forming a valve block 19. Toward the front, this valve block is formed with a valve chamber 20, having a chamber extension 21. Reciprocably mounted within this valve chamber, there is a valve 22 formed with an enlarged annular flange 23, and a stem 24 reciprocably mounted within the chamber extension 21. The valve stem 24 is formed with an annular restricted groove 25, while the two parallel sides of the enlarged flange 23, are capable of engagement with the parallel upper and lower wall of the valve chamber 20 to control the flow of the pressure fluid. Adjacent the valve chamber 20, there is another valve chamber 26, formed with a chamber extension 27. Reciprocably mounted within this last valve chamber, there is a valve 28 formed with an annular sleeved flange 29, and a stem 30 reciprocably mounted within the chamber extension 27. The stroke of the valve 28 is limited in one direction by the engagement of the flange 29 with the upper wall of the valve chamber 26, and in the other direction by the front end of the valve with the lower wall of the valve chamber 26.

The forward end of the valve chamber 20 is connected to the piston chamber 11 through a plurality of ports 31, while the rearward end of the chamber extension 21 is connected to the middle portion of piston chamber 11, through a port 32. Intermediate the ends of the valve chamber extension 21, there is provided an annular recess 33 in communication with the front end of the piston chamber 11 through a plurality of passages 34 and 35. Similarly, the front end of the valve chamber 26 is also in communication with the front end of the piston chamber 11 through the same passages 34 and 35, while the rear end of that valve chamber 26 is in communication with the middle portion of the piston chamber 11 through the port 36. Maintaining the rear end of the valve chamber extension 21 in communication with the atmosphere, there is a restricted port 37 opening into the port 32. The rear end of the valve chamber 26 is likely vented to atmosphere through a restricted port 38, opening into the port 36.

Secured within the outer rear end of the cylinder, there is a backhead 39 within which there is rotatably mounted a throttle valve 40. This throttle valve is formed with an aperture 41 through which pressure fluid may be admitted into an annular recess 42. From the recess 42, the pressure fluid may be admitted into the different portions of the valve block 19 through a plurality of passages 43, which opened into the valve chamber 20, and are in communication with the rear end of the valve chamber extension 27 through the ports 44. The valve chamber 26 is also capable of communication with the passages 43, through a plurality of ports 45.

Intermediate the valve block 19 and backhead 39, there is a rotation mechanism comprising a toothed ring 46, having rotatably secured therein the head 47 of a rifled bar 48. This bar is slidably mounted within a bore of complemental configuration provided in the piston 12, preventing thereby any relative rotation between the bar and the piston. Within the head 47 of the bar 48, there is a plurality of pawls and spring pressed plungers constituting the ratchet mechanism commonly used in machines of this type, and since that mechanism is not intended to form a part of the present invention, no further description of the same is thought necessary.

Leading from the piston chamber 11 to the atmosphere, there is a plurality of exhaust passages 49, the purpose of which will be explained later.

When the throttle valve is positioned as illustrated in Fig. 1, the pressure fluid is admitted into the annular recess 42 through the port 41. From the recess 42, the pressure fluid will flow into the valve chamber 20 through the plurality of passages 43. Assuming the valves 22 and 28 positioned as illustrated in Fig. 2, pressure will flow past the restricted groove 25, thus admitting a relatively small amount of pressure fluid into the larger groove 33. From the groove 33 pressure fluid will flow through the passages 34 and 35 into the front end of the piston chamber 11 to drive the piston 12 rearwardly. Simultaneously pressure fluid is admitted into the rear end of the valve chamber extension 27 through the ports 44, to exert pressure upon the rear end of the valve stem 30, and maintain the valve 28 in its forward position. The valve 22 is maintained in its forward position by the action of the pressure fluid exerting pressure upon the rear face of the flange 23. During the rearward stroke of the piston 12, the rifled bar 48 is held against rotation by the appurtenances of its head 47 in operative engagement with the toothed ring 46. The rifle bar 48 being stationary will cause the piston 12, during its rearward stroke, to rotate in a counterclockwise direction, thus imparting a rotary motion to the cutting tool 18 by its engagement with the chuck 15.

Toward the end of the rearward stroke of the piston, the air remaining in the rear end of the piston chamber 11, will be compressed to act upon the front face of the valve flange 22, tending to throw the valve 22 in the position illustrated in Fig. 4. When the piston finally uncovers the exhaust passages 49, the pressure fluid within the front end of the piston chamber will exhaust to atmosphere, thus relieving the pressure on the rear face of the valve flange 23, through the ports 34, passages 35 and exhaust passages 49, and allowing the valve 22, by the compression exerted on the front face of the valve flange 23, to shift in the position illustrated in Fig. 4. The rear end of the valve chamber extension is constantly vented to the atmosphere through the restricted port 37. When the valve 22 is positioned as illustrated in Fig. 2, and the pressure fluid is flowing from the valve chamber 20 around the restricted valve grooves 25 into the front end of the piston chamber 11, pressure fluid is also admitted into the valve chamber 26 through the port 34. The area of the valve 28, subjected to the pressure fluid from the valve chamber 20, is somewhat larger than the area of the end of the valve stem 30 subjected to the pressure fluid from the valve chamber extension 27. However, the combined area of the groove 33 and passages 34 is greater than the area of the valve groove 25, thus causing a drop of pressure of the motive fluid admitted into the grove 33. Consequently the pressure acting on the actuating area of the valve 28 within the valve chamber 26, being less than the pressure within the chamber extension 27, will have no effect on the valve 28, even though this actuating area is greater than the area of the end of valve stem 30, thus the valve 28 will remain in the forward position.

During the drilling operation, the cutting tool may encounter abrasive material, or the gage of the cutting tool may wear sufficiently to produce the binding of the tool in the drilled hole, thus interfering with the free rotation of the cutting tool as well as the free rearward stroke of the piston. The rearward stroke of the piston will be retarded by any increased torque resistance applied thereto. The volume in the front end of the piston chamber 11, being now increased at a slower rate of speed, will permit the pressure of the fluid flowing therein at a constant rate of speed from the valve chamber 20, to increase proportionally. Thus the pressure of the fluid within the passages 35, 34, and valve chamber 26 will also be increased. This increased pressure acting on the front actuating area of the valve flange 29 will shift and maintain the valve 28 in the position illustrated in Fig. 3. With the valve 28 in that position, the pressure fluid admitted into the front end of the piston chamber 11, to return the piston 12, will be increased by the additional pressure fluid admitted through the plurality of ports 45 now uncovered by the valve 28, increasing thereby the power rotation of the piston 12. It will be noticed that this increase of power is accomplished when an increased resistance of rotation or increased torque resistance is applied to the piston 12.

Assuming now that an increased torque resistance is still applied to the piston, and the valves are positioned as illustrated in Fig. 3, during its rearward stroke, the piston 12 will uncover the port 36, thus admitting pressure fluid into the rear end of the valve chamber 26. The pressure fluid acting on the rear face of the valve flange 29 together with the pressure acting on the rear face of the valve stem 30, will tend to shift the valve forwardly against the pressure acting against the front face of the valve flange 29. When the piston, continuing its rearward stroke, finally uncovers the exhaust passages 49, the pressure within the front end of the piston chamber 11, will be exhausted to atmosphere, thus relieving the pressure acting on the front face of the valve flange 29 through the passages 34 and 35, permitting thereby the valve 28 to be shifted forwardly to close the ports 45. Simultaneously the valve 22 will shift rearwardly as previously explained.

With the valve 22 positioned as illustrated in Fig. 4, pressure fluid will be admitted into the rear end of the piston chamber 11 from the valve chamber 20 through the ports 31, thus driving the piston forwardly. When the piston uncovers the port 32, pressure fluid will be admitted into the rear end of the valve chamber extension 21 to act upon the rear face of the valve stem 24, tending to throw the valve 22 forwardly. When the piston 12 finally uncovers the exhaust ports 49, the pressure within the rear end of the piston chamber 11 will exhaust to atmosphere, thus relieving the pressure upon the front face of the valve flange 23 through the ports 31, and allow the valve 22 to shift forwardly.

During the rearward stroke of the piston 12, if increased torque resistance is still applied to the piston, the valve 28 will shift as explained above. On the contrary, if the piston is free to rotate, the valve 28 will remain in its forward position, pressure fluid being admitted to the front end of the piston chamber 11 solely through the valve 22.

It will be noticed that this invention affords the outstanding feature to provide for an automatic increase of the pressure fluid into the front end of the cylinder, thus varying the power of rotation of the piston, said power being increased when an increased torque resistance is applied to the piston.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a fluid actuated machine, a cylinder having a piston reciprocable and rotatable therein, a rotation mechanism responsive to the reciprocation of said piston to effect its rotation, a fluid actuated valve for controlling the admission of pressure fluid into each end of said cylinder to actuate said piston, and means for controlling the uniform admission of an additional supply of pressure fluid into one end of said cylinder, the operation of said means depending upon an increased torque resistance applied to said piston.

2. In a fluid actuated machine, a cylinder having a piston reciprocable and rotatable therein, fluid actuated means for controlling the admission of the pressure fluid into said cylinder to reciprocate said piston, a combination of means responsive to the reciprocation of said piston to cause its rotation, and further fluid actuated means for controlling an additional supply of the pressure fluid into said cylinder, said additional pressure fluid being automatically supplied into said cylinder when the torque resistance of said piston increases.

3. In a fluid actuated machine, a cylinder having a piston reciprocable and rotatable therein, a rotation mechanism responsive to the reciprocation of said piston to effect its rotation, inlet passages for conveying motive fluid into said cylinder to actuate said piston, and means associated with said passages for uniformly increasing the power of rotation of said piston, the operation of said means depending upon an increased torque resistance applied to said piston.

4. In a fluid actuated machine, a cylinder having a piston reciprocable and rotatable therein, a rotation mechanism associated with said piston to effect its rotation, said piston being subjected to normal or increased torque resistance, a fluid actuated valve for controlling the admission of the motive fluid into said cylinder to actuate said piston, and a second fluid actuated valve subjected to the pressure of the motive fluid to admit an additional supply of motive fluid within one end of said cylinder to increase the power of rotation of said piston when increased torque resistance is applied thereto.

5. In a fluid actuated machine, a cylinder having a piston reciprocable and rotatable therein, a rotation mechanism associated with said piston to effect its rotation, said piston being subjected to normal or increased torque resistance, a fluid actuated valve for controlling the admission of the motive fluid into said cylinder to actuate said piston, and means irrespective of said valve for controlling the admission of an additional supply of motive fluid into one end of said cylinder when said piston is subjected to an increased torque resistance.

6. In a fluid actuated machine, a cylinder having a piston reciprocable therein and capable of rotation, a front housing having a tool slidably mounted therein and rotatable by said piston, a fluid actuated valve for controlling the admission of the motive fluid into said cylinder to actuate said piston, means cooperating with said valve for admitting a restricted amount of motive fluid within one end of said cylinder for rotating said piston when said tool is free to rotate, and means for augmenting the amount of pressure fluid admitted into said one end of said cylinder for rotating said piston when said tool is restrained against rotation.

7. In a fluid actuated machine, a cylinder having a piston reciprocable and rotatable therein, a rotation mechanism associated with said piston to effect its rotation, said piston being subjected to normal and increased torque resistance, a fluid actuated valve for controlling the admission of the pressure fluid into both ends of said cylinder for actuating said piston, the amount of pressure fluid admitted therein being sufficient to actuate said piston when the latter is subjected to normal torque resistance, and means for automatically augmenting the amount of pressure fluid admitted into one end of said cylinder when said piston is subjected to increased torque resistance, increasing thereby the power of rotation of said piston.

8. In a fluid actuated rock drill, the combination of a cylinder, a piston reciprocable and rotatable therein, means responsive to the reciprocation of said piston to effect its rotation, and means responsive to an increased resistance to rotation of said piston for automatically and uniformly increasing the power of rotation of the latter.

9. In a fluid actuated rock drill, the combination of a cylinder, a piston reciprocable and rotatable therein, a rotation mechanism responsive to the reciprocation of said piston to effect its rotation, means for alternatively admitting pressure fluid into the ends of said cylinder to cause the normal operation of said piston, and means for automatically and uniformly increasing the amount of pressure fluid admitted into one end of said cylinder when abnormal torque resistance is applied to said piston.

10. In a fluid actuated machine, the combination of a cylinder having a piston reciprocable and rotatable therein, a rotation mechanism responsive to the reciprocation of said piston to effect its rotation, a valve for automatically controlling the admission of motive fluid into said cylinder to actuate said piston, and means independent of said valve for automatically and uniformly increasing the amount of motive fluid into one end of said cylinder when said piston is subjected to abnormal increased resistance to rotation.

11. In a fluid actuated machine, the combination of a cylinder having a piston reciprocable and rotatable therein, a rotation mechanism associated with said piston to effect its rotation, a valve for automatically controlling the normal admission of motive fluid into both ends of said cylinder to actuate said piston, and a second valve for automatically increasing the amount of motive fluid into one end of said cylinder when said piston is subjected to abnormal increased resistance to rotation.

12. In a fluid actuated rock drill, a cylinder having a piston reciprocable and rotatable therein, a rotation mechanism associated with said piston to effect its rotation, a valve block having a valve reciprocably mounted therein for automatically controlling the admission of motive fluid into said cylinder to actuate said piston, and a second valve normally held into inoperative position but adapted to be shifted into operative position by an abnormal increase of pressure into one end of said cylinder, said valve when in operative position permitting the admission of an additional amount of pressure fluid into said one end of said cylinder.

13. In a fluid actuated rock drill, a cylinder having a piston reciprocable and rotatable therein, a rotation mechanism responsive to the reciprocation of said piston to effect its rotation, a valve block having a duality of valves capable of reciprocation therein, means affording the reciprocation of one of said valves for automatically controlling the admission of the motive fluid into both ends of said cylinder to actuate said piston, means responsive to an abnormal increased resistance to rotation of said piston for actuating the other of said valves into operative position, permitting thereby the admission of an additional amount of pressure fluid into one end of said cylinder, and other means for actuating said valve into inoperative position.

14. In a fluid actuated rock drill, a cylinder having a piston reciprocable and rotatable therein, a rotation mechanism associated with said piston to effect its rotation, a valve block having a valve reciprocable therein in time relation with the reciprocation of said piston for controlling the admission of the pressure fluid into said cylinder to actuate said piston, and a second valve normally held into inoperative position but adapted to be reciprocated in time relation with the reciprocation of said piston when an increased torque resistance is applied to said piston, the reciprocation of said second valve permitting the admission of an additional amount of pressure fluid into one end of said cylinder.

15. In a fluid actuated rock drill, a cylinder having a piston reciprocable and rotatable therein, a rotation mechanism associated with said piston to effect its rotation during the stroke of the latter in one direction, means for controlling the admission of the pressure into said cylinder to effect the normal reciprocation of said piston, and other means responsive to an increased torque resistance applied to said piston for admitting an additional amount of pressure fluid into said cylinder during the stroke of said piston in said one direction and preventing the admission of said additional amount of pressure fluid during the stroke of said piston in the other direction.

16. In a fluid actuated rock drill, a cylinder having a piston reciprocable and rotable therein, a rotation mechanism associated with said piston for effecting its rotation, means for controlling the admission of the pressure fluid into said cylinder to effect the normal reciprocation of said piston, and other means for intermittently admitting an additional amount of pressure into one end of said cylider when said piston is subjected to an abnormal increased resistance to rotation.

JOHN C. CURTIS.